(12) United States Patent
Betz et al.

(10) Patent No.: US 6,419,989 B1
(45) Date of Patent: Jul. 16, 2002

(54) SCRATCH-RESISTANT SOL-GEL COATING FOR CLEAR POWDER-SLURRY LACQUER

(75) Inventors: Peter Betz; Horst Hintze-Büning; Christel Ehlig, all of Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/786,957

(22) PCT Filed: Sep. 8, 1999

(86) PCT No.: PCT/EP99/06607

§ 371 (c)(1),
(2), (4) Date: Jun. 6, 2001

(87) PCT Pub. No.: WO00/16912

PCT Pub. Date: Mar. 30, 2000

(51) Int. Cl.$^7$ .................................................. B05D 3/02
(52) U.S. Cl. ................. 427/385.5; 427/386; 427/388.1; 427/409; 427/410
(58) Field of Search ................................. 427/180, 202, 427/203, 333, 372.2, 379, 384, 385.5, 386, 388.2, 388.4, 402, 407.1, 409, 410

(56) References Cited

U.S. PATENT DOCUMENTS 6,296,903 B1 * 10/2001 Sapper et al. ................ 427/195

FOREIGN PATENT DOCUMENTS

| DE | 43 03 570 A1 | 2/1993 | ............ B05D/7/26 |
| DE | 196 18 657 A1 | 5/1996 | ............ C09D/5/46 |

* cited by examiner

Primary Examiner—Shrive P. Beck
Assistant Examiner—Rebecca A. Blanton

(57) ABSTRACT

The present invention relates to a process for producing coated substrates, especially coated automobile bodies, coils and furniture, in which first of all a powder slurry clearcoat material and then a sol-gel clearcoat material are applied to an optionally precoated substrate and are then cured conjointly.

12 Claims, No Drawings

SCRATCH-RESISTANT SOL-GEL COATING FOR CLEAR POWDER-SLURRY LACQUER

This application claims priority under 35 USC § 120 upon International PCT Application PCT/EP 99/06607 filed Sep. 8, 1999, now WO 00/16912 and German Patent Application DE 198 43 581.9, filed Sep. 23, 1998.

The present invention relates to a process for producing coated substrates, especially coated automobile bodies, in which first of all a powder slurry clearcoat material and then a sol-gel clearcoat material are applied to an optionally precoated substrate and are then cured conjointly.

Automobile bodies are for the most part provided with a multicoat coating system. As the final coat, it is common to apply clearcoat materials. For this purpose it has recently been possible to use what are known as powder slurry clearcoat materials as well.

Powder slurry coating materials comprise powder coating materials in the form of aqueous dispersions. Slurries of this kind are described, for example, in the U.S. patent U.S. Pat. No. 4,268,542 and in the German applications DE-A-195 18 392.4 and 198 14 471.7, which were unpublished at the priority date of the present specification.

Recently, materials known as sol-gel clearcoats and based on siloxane-containing coating formulations have been developed which are obtained by hydrolysis and condensation of silane compounds. These coating materials, which are used as coating compositions on plastics, are described, for example, in the German patents DE-A-43 03 570, 34 07 087, 40 11 045, 40 25 215, 38 28 098, 40 20 316, and 41 22 743.

Sol-gel clearcoats impart very good scratch resistance to substrates made of plastic, such as spectacle lenses or motorcycle helmet visors, for example. This scratch resistance is not achieved by the known OEM (original equipment manufacturing) clearcoat materials normally used for the original finishing of vehicles. The automobile industry is now demanding that this improved scratch resistance be transferred to the clearcoats used in the finishing of automobiles as well.

Replacing the OEM clearcoat materials or OEM powder slurry clearcoat materials commonly used in automotive finishing by sol-gel clearcoat materials is not possible, since the sol-gel clearcoats are too brittle for this purpose, for example, and have poor optical properties (appearance). Above all, the sol-gel clearcoat materials are too expensive. The economically more favorable use of the sol-gel clearcoat materials as an additional coat over the clearcoats or powder slurry clearcoats used to date gives rise to adhesion problems between the clearcoat and the sol-gel coat, these problems arising in particular after stone chipping and on exposure to condensation.

It is therefore an object of the present invention to provide a coating system which comprises a clearcoat and which at the same time has very good scratch resistance and adhesion, and a process for producing said coating system.

This object is surprisingly achieved by the process of the invention for producing a coated substrate, in which a powder slurry clearcoat material and, subsequently, a sol-gel clearcoat material are applied to a substrate to which, if desired, one or more coating compositions are applied first of all, where A) following application at a temperature above the film formation temperature of the powder slurry clearcoat material and below the temperature at which the crosslinking of this powder slurry clearcoat material is complete, the powder slurry clearcoat material is predried and induced to form a film, B) subsequently the sol-gel clearcoat material is applied, and C) finally both coatings are cured conjointly, the powder slurry clearcoat material being only partly cured in step A) and the powder slurry clearcoat material and the sol-gel clearcoat material being chosen such that a chemical bond between them is possible.

It is found that automobile finishes produced by the process of the invention have a very good scratch resistance which cannot be attained using the clearcoat systems that are commonly employed. Furthermore, relative to the prior art clearcoat/sol-gel clearcoat systems, outstanding adhesion of the coats was found, even on stone chipping or following exposure to condensation, i.e., ten days' exposure of the coats in an atmosphere of 40° C. and 100% relative humidity. The optical properties of the coating systems thus produced are also good, and no cracks are found in the scratch-resistant coating.

The process of the invention is elucidated in more detail below.

For the process of the invention it is possible to use any conceivable substrate. By way of example, mention may be made of substrates of metal, plastic, glass or ceramic. The substrate used with preference is a substrate of plastic or, in particular, of metal. The substrate used in accordance with the invention may have any conceivable form, such as the form of a vehicle body, especially an auto body. Furthermore, the substrate may also have been subjected to a surface treatment, such as galvanizing or phosphating, for example.

In accordance with the process of the invention, the substrate may if desired be provided with one or more coats. The coating compositions used for this purpose may comprise any coating compositions used in accordance with the prior art. They may comprise, for example, liquid coating compositions which are aqueous or contain organic solvents, or coating compositions in powder form or in the form of a powder slurry. They may be applied by the processes known from the prior art, such as rolling, spraying, dipping, scattering, or by means of electrodeposition coating, for example.

The process of the invention is preferably used in the context of the multicoat system customary for the finishing of automobiles. In this customary multicoat system, for example, a primer, a surfacer coat, and also basecoats, topcoats and clearcoats are applied to the automobile body. The coating compositions used for the respective coats are known to the skilled worker. The coats may be applied to the body in such a way that, following the application of one coating film, it is dried and/or cured before the next film is applied, or two or more films are applied by the technique known as wet-on-wet, in which these films are dried and/or cured conjointly.

In the context of the preferred use of the process of the invention, therefore, a multicoat system customary for automobile finishing is effected, the clearcoat being formed from the powder slurry clearcoat/sol-gel clearcoat material used in accordance with the invention.

The powder slurry clearcoat/sol-gel clearcoat system is preferably used as a coating over basecoats, which are preferably part of a multicoat system, especially in the automobile industry. Particularly suitable as the basecoat are aqueous basecoat materials based on a polyester, polyurethane resin and an amino resin. In this case the basecoat materials are normally subjected to partial drying, without being crosslinked, after which the powder slurry clearcoat film is applied wet- on-wet.

The process of the invention is further used with preference for the continuous coating of metal sheets or metal strips by the coil coating process. In this case, the powder slurry clearcoat/sol-gel clearcoat system may be applied directly to the metal surface or to a customary and known primer coat that is present thereon. Not least, the process of the invention is also suitable for coating film-coated metal sheets and substrates of wood or glass. Accordingly, the process of the invention may be employed with advantage not only in the automobile sector but also in the fields of industrial coating and of furniture coating.

Powder slurry coating materials are powder coating materials in the form of aqueous dispersions. Powder coating materials, i.e., coating materials in powder form, were developed in order to replace the liquid coating materials which are presently employed with preference for the coating of automobile bodies which cause numerous environmental problems. The use of powder coating materials necessitates a different application technology than the use of liquid coating materials. Therefore, powder coating materials in the form of aqueous dispersions were developed which can be processed using the liquid coating technology.

Powder slurry coating materials (also called powder coating slurries) are powder coating materials in the form of aqueous dispersions. Powder slurry clearcoat materials, accordingly, are powder clearcoat materials in the form of aqueous dispersions.

In the text below, powder slurry coating materials always means powder slurry clearcoat materials, and powder coating materials always means powder clearcoat materials.

A powder slurry coating material normally consists of two components, namely the powder coating material I and an aqueous dispersion II. The two components may not be brought together until they are on the substrate, e.g., by applying the powder coating material I to the optionally coated substrate and then adding the aqueous dispersion II; preferably, the powder slurry coating material is formed by combining the two components prior to application to the substrate.

The first component of the powder slurry clearcoat material used in accordance with the invention comprises a powder clearcoat material I. This may be any of the powder coating materials known to the skilled worker that are suitable for forming a clearcoat film.

In accordance with the invention it is of advantage if the powder clearcoat material I, in a first variant, comprises
- a) at least one epoxide-containing binder containing from 0.5 to 40% by weight, based on the binder, of copolymerized glycidyl-containing monomers, and
- b) as crosslinking agent at least one polycarboxylic acid, in particular a straight-chain dicarboxylic acid, and/or a carboxy-functional polyester and also, if desired, at least one tris(alkoxycarbonylamino)triazine and/or at least one further customary and known crosslinking agent or alternatively
- a) at least one oligomeric or polymeric, epoxide-containing crosslinking agent containing from 0.5 to 40% by weight, based on the crosslinking agent, of copolymerized glycidyl-containing monomers, and/or a low molecular mass, epoxide-containing crosslinking agent, and also, if desired at least one tris(alkoxycarbonylamino)triazine and/or at least one further customary and known crosslinking agent; and
- b) at least one carboxyl-containing polymer as binder, both variants possibly comprising
- c) at least one polyol.

The composition of the powder clearcoat material I may vary widely and may be optimized to the particular end use. In accordance with the invention it is of advantage if the powder clearcoat material I, based on the respective solids, contains the constituents a), b) and c) in the following amounts:
- a) from 55 to 80, with particular preference from 60 to 78, and in particular from 62 to 75% by weight,
- b) from 14 to 30, with particular preference from 17 to 25, and in particular from 18 to 23% by weight, and
- c) from 0 to 22, with particular preference from 2 to 22, and in particular from 4 to 20% by weight.

Suitable epoxy-functional binders a) for the powder clearcoat material I are, for example, polyacrylate resins which contain epoxide groups and are preparable by copolymerizing at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Polyacrylate resins of this kind containing epoxide groups are known, for example, from the patents EP-A-0 299 420, DE-B-22 14 650, DE-B-27 49 576, U.S. Pat. No. 4,091,048 and U.S. Pat. No. 3,781,379.

Examples of suitable monomers for inventive use which contain no epoxide group in the molecule are alkyl esters of acrylic and methacrylic acid, especially methyl acrylate, methyl methacrylate, ethyl acrylate, ethyl methacrylate, n-butyl acrylate, n-butyl methacrylate, secondary-butyl acrylate, secondary-butyl methacrylate, tert-butyl acrylate, tert-butyl methacrylate, neopentyl acrylate, neopentyl methacrylate, 2-ethylhexyl acrylate or 2-ethylhexyl methacrylate; amides of acrylic acid and methacrylic acid, especially acrylamide and methacrylamide; vinylaromatic compounds, especially styrene, methylstyrene or vinyltoluene; the nitriles of acrylic acid and methacrylic acid; vinyl halides and vinylidene halides, especially vinyl chloride or vinylidene fluoride; vinyl esters, especially vinyl acetate and vinyl propionate; vinyl ethers, especially n-butyl vinyl ether; or hydroxyl-containing monomers, especially hydroxyethyl acrylate, hydroxyethyl methacrylate, hydroxypropyl acrylate, hydroxypropyl methacrylate, 4-hydroxybutyl acrylate or 4-hydroxybutyl methacrylate.

Examples of suitable epoxy-functional monomers for inventive use are glycidyl acrylate, glycidyl meth-acrylate, or allyl glycidyl ether.

The polyacrylate resin containing epoxide groups normally has an epoxide equivalent weight of from 400 to 2500, preferably from 420 to 700, a number-average molecular weight Mn (determined by gel permeation chromatography using a polystyrene standard) of from 2000 to 20000, preferably from 3000 to 10000, and a glass transition temperature Tg of from 30 to 80, preferably from 40 to 70, with particular preference from 40 to 60, and in particular from 48 to 52° C. (measured by means of differential scanning calorimetry (DSC)).

The preparation of the polyacrylate resin containing epoxide groups has no special features but instead takes place in accordance with the customary and known polymerization methods.

The further key constituent of the powder coating material I is the crosslinking agent a) or b).

The crosslinking agent b) comprises carboxylic acids, especially saturated, straight-chain, aliphatic dicarboxylic acids having 3 to 20 carbon atoms in the molecule. Instead of them or in addition to them it is also possible to use carboxy-functional polyesters. With very particular preference, dodecane-1,12-dicarboxylic acid is used.

In order to modify the properties of the powder coating materials I it is possible to use minor amounts of other carboxyl-containing crosslinking agents b). Examples of suitable additional crosslinking agents of this type are saturated branched or unsaturated straight-chain dicarboxylic and polycarboxylic acids and also the carboxyl-containing polymers described below in detail as binders b).

Besides these carboxyl-containing crosslinking agents b), further crosslinking agents may be present.

In this context, the further crosslinking agents comprise, in particular, tris(alkoxycarbonylamino)triazines and derivatives thereof. Examples of suitable tris (alkoxycarbonylamino)triazines are described in the patents U.S. Pat. No. 4,939,213, U.S. Pat. No. 5,084,541 or EP-A-0 624 577. Use is made in particular of tris(methoxy-, tris (butoxy- and/or tris(2-ethylhexoxycarbonylamino)triazines.

In accordance with the invention, preference is given to the methyl butyl mixed esters, the butyl 2-ethylhexyl mixed esters, and the butyl esters. These have the advantage over the straight methyl ester of better solubility in polymer melts.

The tris(alkoxycarbonylamino)triazines and their derivatives may also be used in a mixture with conventional crosslinking agents. Particularly suitable for this purpose are blocked polyisocyanates or crosslinkers containing amino groups. It is also possible to use amino resins, examples being melamine resins. In this context it is possible to use any amino resin suitable for transparent topcoat materials or clearcoat materials, or a mixture of such amino resins.

In accordance with the invention, in a second variant, the powder clearcoat materials I may comprise an epoxy-functional crosslinking agent a) and a carboxyl-containing binder b).

Examples of suitable carboxyl-containing binders b) for use in accordance with the invention are, for example, polyacrylate resins prepared by copolymerizing at least one ethylenically unsaturated monomer containing at least one acid group in the molecule with at least one further ethylenically unsaturated monomer containing no acid groups in the molecule.

Examples of highly suitable carboxyl-containing binders b) for use in accordance with the invention are the polyacrylates and polymethacrylates described below under number 1. and also numbers 1.1 to 1.4, with a copolymerized acrylic acid and/or methacrylic acid content >0% by weight.

Examples of suitable oligomeric and polymeric epoxy-functional crosslinking agents a) for use in accordance with the invention are the above-described binders a) containing epoxide groups.

Examples of suitable low molecular mass epoxy-functional crosslinking agents a) for use in accordance with the invention are low molecular mass compounds containing at least two glycidyl groups, especially pentaerythritol tetraglycidyl ether or triglycidyl isocyanurate.

Besides the epoxy-functional crosslinking agents a), the above-described other crosslinking agents may be present.

The binder a) containing epoxide groups and the carboxyl-containing crosslinking agent b) of the first variant of the invention, or the carboxyl-containing binder b) and the epoxy-functional crosslinking agent a) of the second variant of the invention, are generally used in a ratio such that there are from 0.5 to 1.5, preferably from 0.75 to 1.25, equivalents of carboxyl groups per equivalent of epoxide groups. The amount of carboxyl groups present may be determined simply by titration with an alcoholic KOH solution.

In accordance with the invention, the epoxy-functional binder a) or the oligomeric or polymeric, epoxy-functional crosslinking agent a) contains vinylaromatic compounds such as styrene in copolymerized form. In order to limit the risk of cracking on weathering, the amount is, however, not more than 35% by weight, based on the binder a) or the crosslinking agent a). Preferably, from 10 to 25% by weight is incorporated by copolymerization.

The powder clearcoat material I may comprise at least one polyol c).

Suitable polyols c) for use in accordance with the invention include all low molecular mass compounds, oligomers and polymers which contain at least two, preferably at least three, primary and/or secondary hydroxyl groups and which do not destroy the solid state of the powder clearcoat material I.

Examples of suitable oligomers and polymers c) are linear and/or branched and/or block, comb and/or random poly (meth)acrylates, polyesters, polyurethanes, acrylated polyurethanes, acrylated polyesters, polylactones, polycarbonates, polyethers, (meth)acrylate-diols, polyureas or oligomeric polyols.

Where these oligomers and polymers are used as polyols c), they preferably contain no carboxyl groups.

These oligomers and polymers are known to the skilled worker, and numerous suitable compounds are available on the market.

Of these oligomers and polymers c), the polyacrylates, the polyesters and/or the acrylated polyurethanes are of advantage and are therefore used with preference.

Examples of particularly preferred oligomers and polymers c) for use in accordance with the invention are 1. Polyacrylates having a hydroxyl number of from 40 to 240, preferably from 60 to 210, in particular from 100 to 200, an acid number of from 0 to 35, glass transition temperatures of from −35 to +85° C. and number average molecular weights $M_n$ of from 1500 to 300000.

The glass transition temperature of the polyacrylates is determined, as is known, by the nature and amount of the monomers used. The selection of the monomers may be made by the skilled worker with the assistance of the following formula (A), in accordance with which the glass transition temperatures may be calculated approximately.

$$1/Tg = \sum_{n=1}^{n=x} W_n / Tg_n; \sum_n W_n = 1 \tag{A}$$

$Tg$ = glass transition temperature of the polyacrylate resin $W_n$ = weight fraction of the $n$-th monomer $Tg_n$ = glass transition temperature of the homopolymer of the $n$-th monomer $x$ = number of different monomers.

Measures to control the molecular weight (e.g., selection of appropriate polymerization initiators, use of chain transfer agents or of specific techniques of polymerization, etc.) are part of the art and need not be elucidated further here.

1.1 Particularly preferred polyacrylates are preparable by polymerizing (al) from 10 to 92, preferably from 20 to 60% by weight of an alkyl methacrylate or cycloalkyl methacrylate having 1 to 18, preferably 4 to 13 carbon atoms in the alkyl or cycloalkyl radical, or mixtures of such monomers, (a2) from 8 to 60, preferably from 12.5 to 50.0% by weight of a hydroxyalkyl acrylate or a hydroxyalkyl methacrylate having 2 to 4 carbon atoms in the hydroxyalkyl radical, or mixtures of such monomers, (a3) from 0 to 5, preferably from 0.7 to 3% by weight of acrylic acid or methacrylic acid or mixtures of these monomers, and (a4) from 0 to 50, preferably up to 30% by weight of ethylenically unsaturated monomers different than but copolymerizable with (a1), (a2) and (a3), or mixtures of such monomers, to give polyacrylates of the specification stated above.

Examples of suitable (a1) components are methyl, ethyl, propyl, n-butyl, isobutyl, tert-butyl, pentyl, hexyl, heptyl or 2-ethylhexyl acrylate or methacrylate and also cyclohexyl, tertbutylcyclohexyl or isobornyl acrylate or methacrylate.

Examples of suitable (a2) components are hydroxyethyl, hydroxypropyl or hydroxybutyl or hydroxymethylcyclohexyl acrylate or methacrylate or adducts of (meth)acrylic acid and epoxides, such as Versatic acid® glycidyl esters.

Examples of suitable (a4) components are vinylaromatics such as styrene, vinyltoluene, alpha-methylstyrene, alpha-ethylstyrene, ring-substituted diethylstyrenes, isopropylstyrene, butylstyrene and methoxystyrenes; vinyl ethers such as ethyl vinyl ether, n-propyl vinyl ether, isopropyl vinyl ether, n-butyl vinyl ether or isobutyl vinyl ether; vinyl esters such as vinyl acetate, vinyl propionate, vinyl butyrate, vinyl pivalate or the vinyl ester of 2-methyl-2-ethylheptanoic acid; or allyl ethers such as trimethylolpropane monoallyl, diallyl or triallyl ether, or ethoxylated or propoxylated allyl alcohol.

1.2 Further examples of particularly preferred polyacrylates are described in the European patent application EP-A-0 767 185 and in the American patents U.S. Pat. Nos. 5,480,493, 5,475,073 or 5,534,598.

1.3 Further examples of particularly preferred polyacrylates are sold under the brand name Joncryl®, such as, for instance, Joncryl® SCX 912 and 922.5.

1.4 Further examples of particularly preferred polyacrylates are those obtainable by polymerizing (al) from 10 to 51% by weight, preferably from 25 to 41% by weight, of 4-hydroxy-n-butyl acrylate or methacrylate or a mixture thereof, but especially 4-hydroxy-n-butyl acrylate, (a2) from 0 to 36% by weight, preferably from 0.1 to 20% by weight, of a non-(a1) hydroxyl-containing ester of acrylic acid or of methacrylic acid, or a mixture thereof, (a3) from 28 to 85% by weight, preferably from 40 to 70% by weight, of a non-(a1) or -(a2) aliphatic or cycloaliphatic ester of methacrylic acid having at least four carbon atoms in the alcohol residue, or of a mixture of such monomers, (a4) from 0 to 3% by weight, preferably from 0.1 to 2% by weight, of an ethylenically unsaturated carboxylic acid or a mixture of such acids, and (a5) from 0 to 20% by weight, preferably from 5 to 15% by weight, of a non-(a1), -(a3) or -(a4) unsaturated monomer, or a mixture of such monomers, to give a polyacrylate having a hydroxyl number of from 60 to 200, preferably from 100 to 160, an acid number of from 0 to 35, and a number average molecular weight $M_n$ of from 1500 to 10000, the composition of component (a3) being chosen such that polymerization of this component (a3) alone gives a polymethacrylate having a glass transition temperature of from +10 to +100° C., preferably from +20 to +60° C.

Examples of suitable components (a2) are hydroxyalkyl esters of acrylic acid and methacrylic acid such as hydroxyethyl or hydroxypropyl acrylate or methacrylate, the choice being made such that polymerization of this component (a2) alone gives a polyacrylate having a glass transition temperature of from 0 to +80° C., preferably from +20 to +60° C.

Examples of suitable components (a3) are aliphatic esters of methacrylic acid having from four to 20 carbon atoms in the alcohol residue, such as n-butyl, isobutyl, tert-butyl, 2-ethylhexyl, stearyl and lauryl methacrylate; or cycloaliphatic esters of methacrylic acid, such as cyclohexyl methacrylate.

Examples of suitable components (a4) are acrylic acid and/or methacrylic acid.

Examples of suitable components (a5) are vinylaromatic hydrocarbons such as styrene, alpha-alkylstyrene or vinyltoluene; amides of acrylic acid and methacrylic acid such as methacrylamide and acrylamide; nitriles of acrylic acid and methacrylic acid; vinyl ethers or vinyl esters, the composition of this component (a5) preferably being made such that polymerization of components (a5) alone results in a polyacrylate having a glass transition temperature of from +70 to +120° C., in particular from +80 to +100° C.

1.5 The preparation of these polyacrylates is widely known and is described, for example, in the standard work Houben-Weyl, Methoden der organischen Chemie, 4th edition, Volume 14/1, pages 24 to 255, 1961.

2. Polyester resins which are preparable by reacting (a1) at least one cycloaliphatic or aliphatic polycarboxylic acid, (a2) at least one aliphatic or cycloaliphatic polyol containing more than two hydroxyl groups in the molecule, (a3) at least one aliphatic or cycloaliphatic diol, and (a4) at least one aliphatic, linear or branched saturated monocarboxylic acid, in a molar ratio of (a1):(a2):(a3):(a4)=1.0:0.2 to 1.3:0.0 to 1.1:0.0 to 1.4, preferably 1.0:0.5 to 1.2:0.0 to 0.6:0.2 to 0.9, to give a polyester or alkyd resin.

Examples of suitable components (a1) are hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid or sebacic acid.

Examples of suitable components (a2) are pentaerythritol, trimethylolpropane, triethylolethane and glycerol.

Examples of suitable components (a3) are ethylene glycol, diethylene glycol, propylene glycol, neopentyl glycol, 2-methyl-2-propyl-1,3-propanediol, 2-methyl-2-butyl-1,3-propanediol, 2,2,4-trimethyl-1,5-pentanediol, 2,2,5-trimethyl-1,6-hexanediol, neopentyl glycol hydroxypivalate or dimethylolcyclohexane.

Examples of suitable components (a4) are 2-ethylhexanoic acid, lauric acid, isooctanoic acid, isononanoic acid or monocarboxylic acid mixtures obtained from coconut oil or palm kernel oil.

The preparation of the polyesters and alkyd resins used with preference in accordance with the invention is widely known and is described, for example, in the standard work Ullmanns Encyklopädie der technischen Chemie, 3rd edition, Volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

3. Polyurethanes as described in the patents EP-A-0 708 788, DE-A-44 01 544 or DE-A-195 34 361.

Further examples of inventively suitable oligomers c) are oligomeric polyols which are obtainable by hydroformylation and subsequent hydrogenation from oligomeric intermediates obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures which are obtained in petroleum processing by cracking ($C_5$ cut); examples of suitable oligomeric polyols for use in accordance with the invention have a hydroxyl number (OHN) of from 200 to 450, a number average molecular weight Mn of from 400 to 1000, and a mass average molecular weight $M_w$ of from 600 to 1100;

Examples of suitable low molecular mass compounds c) are branched, cyclic and/or acyclic $C_9$–$C_{16}$ alkanes functionalized with at least two hydroxyl groups, especially diethyloctanediols, and also cyclohexanedimethanol, neopentyl glycol hydroxy-pivalate, neopentyl glycol, trimethylolpropane or pentaerythritol.

Of the above-described polyols c), the carboxyl-free polyacrylates and polymethacrylates which are described above under number 1.1 are of very particular advantage and are therefore used with very particular preference.

The powder clearcoat materials I may comprise one or more suitable catalysts for curing the epoxy resins. Examples of suitable catalysts are phosphonium salts and tetraalkylammonium salts of organic and inorganic acids, amines, imidazole and imidazole derivatives. The catalysts are used in general in amounts of from 0.001 to 2% by weight, based on the overall weight of the component a) or b) containing epoxide groups, and also of the component b) or a) containing carboxyl groups.

Examples of suitable phosphonium salts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide or tetrabutylphosphonium acetate-acetic acid complex. These and other suitable phosphonium catalysts are described, for example, in the patents U.S. Pat. No. 3,477,990 and U.S. Pat. No. 3,341,580.

Examples of suitable tetraalkylammonium salts are cetyltrimethylammonium bromide and dicetyldimethylammonium bromide.

Examples of suitable imidazole catalysts are 2-styrylimidazole, 1-benzyl-2-methylimidazole, 2-methylimidazole and 2-butylimidazole. These and other suitable imidazole catalysts are described in the Belgian patent no. 756 693.

The powder clearcoat material I may further comprise devolatilizers such as benzoin, leveling agents based on polyacrylates, polysiloxanes or fluorine compounds, UV absorbers such as triazines and benzotriazoles, free-radical scavengers such as 2,2,6,6-tetramethylpiperidine derivatives, and/or antioxidants such as hydrazines, phosphorus compounds as reducing agents, and 2,6-di-tert-butylphenol derivatives as free-radical scavengers, and also further suitable auxiliaries and additives.

The powder clearcoat slurry contains, based on its overall amount, the component I in an amount of from 5 to 80, preferably from 10 to 70, with particular preference from 15 to 60, and in particular from 20 to 50% by weight.

The component II consists substantially of water; advantageously, however, it is itself a dispersion comprising IIa) at least one nonionic thickener and a dispersant and, if desired, IIb) catalysts, auxiliaries, defoamers, preferably carboxy-functional dispersants, wetting agents, antioxidants, UV absorbers, free-radical scavengers, small amounts of solvents, leveling agents, biocides, crosslinking agents and/or water retention agents.

In accordance with the invention the component II contains, based on its overall amount, from 0.01 to 20, preferably from 1 to 15, with particular preference from 2 to 10, and in particular from 5 to 9% by weight of component IIa) and also from 0.001 to 20, preferably from 0.01 to 15, with particular preference from 0.1 to 10, and in particular from 1 to 9% by weight of component IIb).

The suitable nonionic associative thickeners have the following structural features:

IIaa) a hydrophilic structure which ensures sufficient solubility in water, and

IIab) hydrophobic groups capable of associative interaction in the aqueous medium.

Examples of suitable hydrophobic groups IIab) are long-chain alkyl radicals such as dodecyl, hexadecyl, or octadecyl radicals or alkylaryl radicals such as octylphenyl or nonylphenyl radicals.

Examples of suitable hydrophilic structures IIaa) are polyacrylates, cellulose ethers or, in particular, polyurethanes, which contain the hydrophilic groups as polymer building blocks. Particularly preferred hydrophilic structures in this context are polyurethanes containing polyether chains, preferably from polyethylene oxide, as building blocks.

Preferred dispersants IIa) used are polyurethane resins.

The polyurethane resins IIa) employed with preference consist preferably of 1. at least one organic component having at least two reactive hydrogen atoms,
2. a monofunctional ether, and
3. a polyisocyanate.

The organic component of the polyurethane composition IIa) comprises a polyester polyol, a low molecular mass diol and/or triol, or mixtures thereof. If desired, a trifunctional hydroxyl-containing monomer can be used as well.

In a second preferred embodiment the polyurethane IIa) comprises 1. at least one organic component having at least two reactive hydrogen atoms,
2. a nonionic stabilizer which is prepared by reacting
   i. a monofunctional polyether with a polyisocyanate component to produce an isocyanate intermediate and
   ii. a component having at least one active amine group and at least two active hydroxyl groups, and
3. at least one polyisocyanate component.

The organic component preferably comprises a polyether polyester polyol, a low molecular mass diol and/or triol, or mixtures thereof.

The polyester component can be prepared by reacting at least one dicarboxylic acid and at least one alcohol component, the alcohol comprising at least two hydroxyl groups. The carboxylic acid component comprises two or more carboxyl groups.

In addition to the carboxylic acids the polyester resin can also comprise one or more low molecular mass diols or triols. In principle, any polyol can be employed.

The polyester resins or mixtures of polyester resins employed comprise preferably terminal hydroxyl groups. This is brought about by adding an excess of polyols.

For the synthesis of the polyesters it is possible to employ both monocarboxylic acids and monoalcohols. Preferably, however, the monocarboxylic acids and/or monoalcohols are present in a very small amount by weight in the polyester resin.

The polyester diol components employed with preference comprise between 20 and 80% by weight of the polyurethane resin IIa). The amounts are preferably between 50 and 70% by weight. Very particular preference is given to from 55 to 65% by weight.

The polyurethane IIa) is prepared employing polyester polyols having a molecular weight of between 500 and 5000. Preference is given to molecular weights of between 1000 and 3500.

In addition to the polyester diols, the polyurethane resins IIa) can comprise further organic components having at least two reactive hydrogen atoms. These are preferably diols and triols, thiols and/or amines, or mixtures of these substances. The components used to synthesize the polyester component can also be employed here as separate components. In other words, dialcohols or trialcohols, such as neopentyl glycol or 1,6-hexanediol, for example, are also suitable as an additional organic component in the polyurethane IIa).

The molecular weight of the diols and/or triols employed in the polyurethane resin IIa) is between 0 and 20% by weight. Preference is given to from 1 to 6% by weight.

The polyurethane resin IIa) additionally comprises polyisocyanates, especially diisocyanates. The isocyanates are present at between 5 and 40% by weight based on the polyurethane mass. Particular preference is given to from 10 to 30% by weight and very particular preference to from 10 to 20% by weight. To prepare the polyurethane IIa), finally, a monofunctional polyether is employed.

In a second variant, a nonionic dispersant IIa) is prepared by, preferably, reacting a monofunctional polyether with a diisocyanate. The resultant reaction product is then reacted with a component which comprises at least one active amine group and at least two active hydroxyl groups.

In one particular embodiment the polyurethane IIa) comprises a reaction product of:
1. a polyester polyol, which is in turn a reaction product of a carboxylic acid having at least two carboxyl groups and a component having at least two hydroxyl groups,
2. at least one low molecular mass component having at least two hydroxyl groups,
3. at least one polyisocyanate component,
4. a nonionic stabilizer prepared by reacting a monofunctional ether with a polyisocyanate and then reacting the resultant reaction product with a component which comprises at least one active amine group and at least two active hydroxyl groups.

In a fourth variant, the polyurethane comprises a reaction product of
1. a polyester polyol,
2. at least one low molecular mass diol or triol,
3. a polyisocyanate,
4. a trihydroxyl-containing monomer,
5. a monofunctional hydroxyl-containing polyether.

The polyesters are synthesized using the above-described carboxylic acid components and an excess of polyols. The excess of polyols is chosen so that preferably terminal hydroxyl groups are formed. The polyols preferably have a hydroxyl functionality of at least two.

The polyester resin consists preferably of one or more polyols, preferably comprising one diol. Diols employed with preference are alkylene glycols, such as ethylene glycol, propylene glycol, butylene glycol and neopentyl glycol, 1,6-hexanediol or other glycols, such as bisphenol A, cyclohexanedimethanol, caprolactonediol, hydroxyalkylated bisphenol, and similar compounds.

The low molecular mass diols which are preferably employed in accordance with the invention are known from the prior art. They include aliphatic diols, preferably alkylene polyols having 2 to 18 carbon atoms. Examples of such are 1,4-butanediol and cycloaliphatic diols, such as 1,2-cyclohexanediol and cyclohexanedimethanol.

Suitable organic polyisocyanates in accordance with the invention are preferably those which comprise at least two isocyanate groups. Particular preference is given to diisocyanates, e.g. p-phenylene diisocyanate, biphenyl 4,4'-diisocyanate, toluene diisocyanates (TDI), 3,3'-dimethyl-4,4'-biphenylene diisocyanate, 1,4-tetramethylene diisocyanate, 1,6-hexamethylene diisocyanate (HDI), 2,2,4-trimethylhexane 1,6-diisocyanate, methylenebis(phenyl isocyanates), 1,5-naphthalene diisocyanate, bis(isocyanatoethyl fumarate), isophorone diisocyanate (IPDI) and methylenebis(4-cyclohexyl isocyanate).

In addition to the abovementioned diisocyanates, other multifunctional isocyanates are also used. Examples are 1,2,4-benzene triisocyanate and polymethylenepolyphenylene polyisocyanate.

Particular preference is given to the use of aliphatic diisocyanates, examples being 1,6-hexamethylene diisocyanate, 1,4-butylene diisocyanate, methylenebis(4-cyclohexyl isocyanate), isophorone diisocyanate and 2,4-toluene diisocyanate.

Relatively long-chain polyurethane resins IIa) can be obtained by chain extension with components containing diol and/or triol groups. Particular preference is given to chain extenders having at least two reactive hydrogen atoms, examples being diols, thiols, diamines, alkanolamines, aminoalkyl mercaptans or hydroxyalkyl mercaptans or mixtures of these substances.

Examples of diols employed as chain extenders are 1,6-hexanediol, cyclohexanedimethylol and 1,4-butanediol. A particularly preferred diol is neopentyl glycol.

The polyethers inventively employed are preferably mono- or difunctional polyethers. The monofunctional ones include, for example, those prepared by polymerizing ethylene oxides, propylene oxides or mixtures thereof.

The polyurethane IIa) described can be mixed with conventional crosslinkers. These include preferably amino resins, e.g. melamine. It is also possible to employ condensation products of other amines and amides, e.g. aldehyde condensates of triazines, diazines, triazoles, guanadines, guanamines or alkyl- and aryl-substituted derivatives of such components. Some examples of such components are N,N'-dimethylurea, dicyandiamide, 2-chloro-4,6-diamino-1,3,5-triazine, 6-methyl-2,4-diamino-1,3,5-triazine, 3,5-diaminotriazole, triaminopyrimidines, 2-mercapto-4,6-diaminopyrimidine, 2,4,6-triethyltriamino-1,3,5-triazine and similar substances.

The preferred aldehyde comprises formaldehyde. It is also possible to employ acetaldehyde, crotonaldehyde, acrolein, benzaldehyde and furfural.

The amine-aldehyde condensation products can comprise methylol or similar alcohol groups. Examples of alcohols which can be employed are methanol, ethanol, propanol, butanol, pentanol, hexanol, heptanol, benzyl alcohol and aromatic alcohols, cyclic alcohols, such as cyclohexanol, monoethers or glycols, and also substituted alcohols, e.g., 3-chloropropanol.

In addition to the abovementioned isocyanates it is also possible to employ blocked polyisocyanates as crosslinking agents. Examples of these include organic polyisocyanates such as trimethylene, tetramethylene, hexamethylene, 1,2-propylene, 1,2-butylene and 2,3-butylene diisocyanate. Further candidates for use include cycloalkane components such as 1,3-cyclopentane, 1,4-cyclohexane and 1,2-cyclohexane diisocyanates. It is also possible to use aromatic components such as phenylene, p-phenylene, 4,4'-diphenyl, 1,5-napthalene and 1,4-naphthalene diisocyanates. Components suitable in addition to these are aliphatic-aromatic components such as 4,4'-diphenylenemethane, 2,4- or 2,6-tolylene, or mixtures thereof, 4,4'-toluidine and 1,4-xylylene diisocyanates. Further examples are ring-substituted aromatic components such as 4,4'-diphenyl ether diisocyanate and chlorodiphenylene diisocyanates. Triisocyanates which can be employed are triphenylmethane 4,4', 4''-triisocyanate, 1,3,5-triisocyanatobenzene and 2,4,6-triisocyanatotoluene. A tetraisocyanate which can be used, finally, is 4,4'-diphenyldimethylmethane 2,2',5,5'-tetraisocyanate.

Blocking agents which can be employed include aliphatic, cycloaliphatic and aromatic alkyl monoalcohols. Examples of these include methyl, ethyl, chloroethyl, propyl, butyl, cyclohexyl, heptyl, octyl, nonyl, 3,3,5-trimethylhexanol, decyl and lauryl alcohols. Examples of phenolic components which can be used are phenols or substituted phenols. Examples thereof are cresol, xylenol, nitrophenol, chlorophenol, ethylphenol, 1-butylphenol and 2,5-di-tert-butyl-4-hydroxytoluene.

Further suitable blocking agents are tertiary hydroxylamines, e.g., diethylethanolamine, and oximes, such as methyl ethyl ketone oxime, acetone oxime and cyclohexanone oxime.

In the process of the invention, moreover, particular preference is given to the use of the powder clearcoat slurries of the German application 198 14 471.7, unpublished at the priority date of the present specification; they are hereby introduced into the process of the invention.

The solid powder coating materials I are prepared in accordance with the known methods (cf., e.g., BASF Lacke+ Farben AG Product Information Bulletin "Pulverlacke" [Powder Coating Materials], 1990) by homogenizing and dispersing, for example by means of an extruder, screw compounder, and the like. Following preparation of the powder coating materials, they are prepared for dispersing by grinding and, if appropriate, by classifying and sieving.

Finally, the aqueous powder slurry clearcoat material or the powder clearcoat material dispersion may be obtained from the powder coating material I as first component and from the aqueous dispersion II as second component, by wet grinding or by stirred incorporation of dry-ground powder coating material I into the aqueous dispersion II. Wet grinding is preferred.

Following the dispersion of component I in component II, grinding takes place, if desired, the pH is adjusted to 4.0 to 7.0, preferably 5.5 to 6.5 and the resulting slurry is filtered.

The average particle size is, for example, between 1 and 25 µm, preferably below 20 µm, and with particular preference between 3 and 10 µm.

Before or after the wet grinding or the introduction of the dry powder coating material I into water, possibly already containing constituents of the aqueous dispersion, there may be added to the dispersion II a defoamer mixture, an ammonium salt and/or alkali metal salt, a polyurethane-based dispersant IIa), a carboxy-functional dispersant, wetting agent and/or thickener mixture, and also the other additives. Preferably, defoamer, dispersant, wetting agent and/or thickener are first dispersed in water, after which the powder clearcoat material I is stirred in, in small portions. Subsequently, defoamer, dispersant, wetting agent and/or thickener are dispersed in again. Finally, the powder clearcoat material I is stirred in again, in small portions.

In accordance with the invention the pH is preferably adjusted using ammonia and/or amines. The pH may initially rise, giving a strongly basic dispersion.

However, the pH falls back to the above-indicated levels within a few hours or days.

The powder slurry clearcoat material may be applied to the uncoated or coated substrate using the methods which are known from liquid coating technology (e.g., spraying, rolling, or dipping). In particular, it is applied by means of spraying techniques.

For coatings, it is common to use coating materials based on organic polymers. By organic polymers are meant those formed essentially from carbon-containing monomers, the carbon atoms being incorporated into the resultant polymer chain. The powder slurry clearcoat material is also, in this sense, a coating material based on organic polymers.

In comparison, the so-called sol-gel clearcoat materials which are key to the process of the invention comprise siloxane-containing coating formulations which can be prepared by reacting hydrolyzable silicon compounds with water or water donors and which comprise organic constituents in order to improve certain properties. A general description of such systems is given, for example, in the article by Bruce M. Novak, "Hybrid Nanocomposite Materials-Between Inorganic Glasses and Organic Polymers", in Advanced Materials, 1993, 5, No. 6, pp. 422–433, or in the presentation by R. Kasemann, H. Schmidt, 15th International Conference, International Centre for Coatings Technology, Paper 7, "Coatings for mechanical and chemical protection based on organic-inorganic sol-gel nanocomposites", 1993.

The base reactions take place in a sol-gel process in which tetraorthosilicates are hydrolyzed and condensed in the presence or absence of a cosolvent:

Hydrolysis

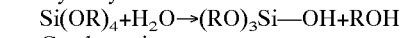

Condensation

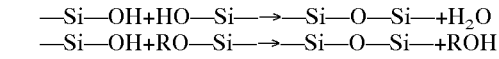

where R can be an alkyl group, such as methyl or ethyl. Frequently, tetramethyl orthosilicate (TMOS) or tetraethyl orthosilicate (TEOS) are used. To catalyze the reactions, acids, bases or fluoride ions are used.

The sol-gel clearcoat materials used in accordance with the invention are siloxane-containing structures modified with organic constituents (ormocer=organically modified ceramic).

By means of controlled hydrolysis and condensation of silicic esters and, if appropriate, of metal alkoxides, base materials for coatings are prepared. The systems acquire specific properties through the incorporation of organically modified silicic acid derivatives into the silicatic network. They permit the construction of an organic polymer network in addition to the inorganic framework, if polymerizable organic radicals (e.g., olefins, epoxides) are used.

The modification can come about, for example, as a result of the presence of a ready-made organic polymer during the hydrolysis and condensation of the starting materials or in the sol (type I).

If the polymer present contains functional groups, such as trialkoxysilyl units, —CH₂Si(OR)₃, for example, which are able to react with the inorganic phase, a material is obtained which contains covalent bonds between the inorganic and the organic phase (type II).

Further, the organically modified sol-gel systems are obtained by simultaneous polymerization of the inorganic and organic phase (type III).

With these types as well, chemical bonds may be obtained between the inorganic and the organic phase as a result of appropriate functional groups (type IV).

Alternatively, it is possible to use sol-gel clearcoat materials obtained by incorporating organically modified silicic acid derivatives into the silicatic network without adding polymerizable organic radicals.

The sol-gel clearcoat materials used in accordance with the invention can be obtained, for example, by controlled hydrolysis and condensation of organically modified hydrolyzable silane. This can be done, if desired, in the presence of organic monomers, solvents, organically modified hydrolyzable metal alkoxides, and metal oxides in the form of nanoparticles.

The hydrolyzable silane comprises compounds of the general formula (B)

$$SiR_4 \qquad (B)$$

in which the radicals R, which may be identical or different, are selected from hydrolyzable groups, hydroxyl groups, and nonhydrolyzable groups.

The nonhydrolyzable groups R in the general formula (B) are preferably selected from alkyl, having in particular 1 to 4 carbon atoms, such as methyl, ethyl, propyl and butyl; alkenyl, having in particular 2 to 4 carbon atoms, such as vinyl, 1-propenyl, 2-propenyl and butenyl; alkynyl, having in particular 2 to 4 carbon atoms, such as acetylenyl and propargyl; and aryl, having in particular 6 to 10 carbon atoms, such as phenyl and naphthyl, for example. Nonhydrolyzable groups R used are preferably alkyl groups.

Examples of hydrolyzable groups R in the above formula (B) are alkoxy, having in particular 1 to 4 carbon atoms, such as methoxy, ethoxy, n-propoxy, isopropoxy and butoxy; aryloxy, having in particular 6 to 10 carbon atoms, such as phenoxy; acyloxy, having in particular 1 to 4 carbon atoms, such as acetoxy and propionyloxy; and alkylcarbonyl, such as acetyl, for example.

In addition to the abovementioned preferred hydrolyzable groups R, the following may be mentioned as further groups which are likewise suitable: hydrogen and alkoxy radicals having 5 to 20, especially 5 to 10 carbon atoms and alkoxy-substituted alkoxy groups, such as beta-methoxyethoxy, for example. Particularly preferred hydrolyzable groups R are those which carry no substituents and lead to hydrolysis products of low molecular weight, examples being lower alcohols, such as methanol, ethanol, propanol, n-butanol, isobutanol, sec-butanol, and tert-butanol.

At least one group R of the formula (B) must be a hydrolyzable group; compounds of the formula (B) having three or four hydrolyzable groups R are particularly preferred.

In addition, the hydrolyzable silanes preferably include a nonhydrolyzable group R which contains a functional group. These functional groups can, for example, be epoxy groups, amino groups, olefinically unsaturated groups such as vinyl or (meth)acrylic groups, mercapto groups, isocyanate groups and/or reaction products thereof with further reactive compounds.

Examples of highly suitable hydrolyzable silanes for use in accordance with the invention are methyltriethoxysilane, methyltrimethoxysilane, tetramethyl orthosilicate, tetraethyl orthosilicate, 3-glycidyloxypropyltrimethoxysilane, and 3-aminopropyltriethoxysilane.

The compounds of the general formula (B) can be used in whole or in part in the form of precondensates, i.e., compounds formed by partial hydrolysis of the compounds of the formula (B), either alone or in a mixture with other hydrolyzable compounds.

Organic monomers which can be used are all monomers known to the skilled worker for the formation of polymers. Examples of suitable monomers are the monomers described above which are used to prepare polyacrylates, polyesters or polyurethanes, and the monomers described below which are used to prepare the acrylic copolymers (A1).

Where the mixture includes organic monomers, the hydrolysis and condensation of the hydrolyzable silanes (B) is preferably conducted in such a way that the corresponding polymers are formed from the organic monomers. For this purpose it is possible to use the customary and known initiators, examples being those described below (Type III).

The hydrolysis and condensation of the hydrolyzable silanes (B), or the modification of the sol-gel clearcoat material, is preferably conducted in the presence of a ready-made organic polymer (Type I).

This polymer is preferably used as a solution in organic solvents.

Particular preference is given to the use of acrylic copolymers (A1) prepared by copolymerizing the following monomers (a11) and (a13) and also, if desired, further monomers (a12), (a14), (a15) and/or (a16), the nature and amount of (a11) and (a13) and also, if used, (a12), (a14), (a15) and (a16) being selected such that the acrylic copolymer (Al) has the desired OH number, acid number, and the desired molecular weight. Preferably, the acrylic copolymers (A1) have a hydroxyl number of from 0 to 240, with particular preference from 0 to 200, and in particular from 0 to 150, an acid number of from 5 to 100, with particular preference from 10 to 60, and in particular from 20 to 40, glass transition temperatures of from −35 to +85° C., and number-average molecular weights Mn of from 1500 to 300000.

The polyacrylate resins used inventively may be prepared using as monomer (a11) any (meth)acrylic acid alkyl or cycloalkyl ester which is copolymerizable with (a12), (a13), (a14), (a15) and (a16) and has up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylates, especially cyclohexyl, isobornyl, dicyclopentadienyl, octahydro-4,7-methano-1H-indenemethanol or tertbutylcyclohexyl (meth)acrylate; (meth)acrylic oxaalkyl or oxacycloalkyl esters such as ethyltriglycol (meth)acrylate and methoxyoligoglycol (meth)acrylate having a molecular weight Mn of preferably 550; or other ethoxylated and/or propoxylated, hydroxyl-free (meth)acrylic acid derivatives. These monomers may include, in minor amounts, more highly functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth)acrylate; or pentaerythritol di-, tri- or tetra(meth)acrylate. In the context of the present invention, minor amounts of higher-functional monomers are those amounts that do not lead to crosslinking or gelling of the polyacrylate resins.

As the monomer (a12) it is possible to use any ethylenically unsaturated monomers which are copolymerizable with (a11), (a12), (a13), (a14), (a15) and (a16) and different from (a15) which carry at least one hydroxyl group per molecule and are essentially free from acid groups, such as hydroxyalkyl esters of acrylic acid, methacrylic acid or another alpha,beta-ethylenically unsaturated carboxylic acid which are derived from an alkylene glycol which is esterified with the acid or are obtainable by reacting the acid with an alkylene oxide; especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsiloncaprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. As far as these higher-functional monomers (a12) are concerned, the comments made for the higher-functional monomers (a11) apply analogously. The proportion of trimethylolpropane monoallyl ether is usually from 2 to 10% by weight, based on the overall weight of the monomers (a11) to (a16) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may be used proportionately in combination with other of the abovementioned hydroxyl-containing monomers.

As the monomer (a13) it is possible to use any ethylenically unsaturated monomer, or mixture of such monomers, which carries at least one acid group, preferably one carboxyl group, per molecule and is copolymerizable with (a11), (a12), (a14), (a15) and (a16). As component (a13) it is particularly preferred to use acrylic acid and/or methacrylic acid. However, other ethylenically unsaturated carboxylic acids having up to 6 carbon atoms in the molecule may also be used. Examples of such acids are ethacrylic acid, crotonic acid, maleic acid, fumaric acid, and itaconic acid. It is further possible to use ethylenically unsaturated sulfonic or phosphonic acids, and/or their partial esters, as component (a13). Further suitable components (a13) include mono(meth)acryloyloxyethyl maleate, succinate and phthalate.

As the monomer (a14) it is possible to use one or more vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom.

As the monomer (a15), use is made of the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the trade name "Cardura". The reaction of the acrylic or methacrylic acid with the glycidyl ester of a carboxylic acid having a tertiary alpha carbon atom can take place before, during or after the polymerization reaction. As the component (a15) it is preferred to use the reaction product of acrylic acid and/or methacrylic acid with the glycidyl ester of Versatic acid. This glycidyl ester is commercially available under the name "Cardura E10".

As the monomer (a16) it is possible to use all ethylenically unsaturated monomers, or mixtures of such monomers, which are copolymerizable with (a11), (a12), (a13), (a14) and (a15), are different from (a11), (a12), (a13) and (a14), and are substantially free from acid groups. Suitable components (a16) include the following:

olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl- and/or N,N-cyclohexylmethyl(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butylate, vinyl pivalate and/or the vinyl ester of 2-methyl-2-ethylheptanoic acid; and/or polysiloxane macromonomers having a number-average molecular weight Mn of from 1000 to 40000, preferably from 2000 to 20000, with particular preference from 2500 to 10000 and in particular from 3000 to 7000 and having on average from 0.5 to 2.5, preferably from 0.5 to 1.5, ethylenically unsaturated double bonds per molecule, as described in DE 38 07 571 A1 on pages 5 to 7, in DE 37 06 095 A1 in columns 3 to 7, in EP 0 358 153 B1 on pages 3 to 6, in U.S. Pat. No. 4,754,014 in columns 5 to 9, in DE 44 21 823 A1 or in the international patent application WO 92/22615 on page 12, line 18 to page 18, line 10, or acryloxysilane-containing vinyl monomers, preparable by reacting hydroxy-functional silanes with epichlorohydrin and subsequently reacting the reaction product with methacrylic acid and/or hydroxyalkyl esters of (meth)acrylic acid.

Preference is given to using vinylaromatic hydrocarbons, especially styrene.

The nature and amount of the monomers (a11) to (a16) is selected such that the acrylic copolymer (A1) has the desired OH number, acid number, and glass transition temperature. Acrylic copolymers (A1) used with particular preference are obtained by polymerizing (a11) from 20 to 99% by weight, preferably from 30 to 50% by weight, of the component (a11), (a12) from 0 to 50% by weight, preferably from 0 to 40% by weight, of the component (a12), (a13) from 1to 20% by weight, preferably from 1to 10% by w eight, of the component (a13), (a14) from 0 to 25% by weight of the component (a14), (a15) from 0 to 25% by weight of the component (a15), and (a16) from 0 to 30% by weight, preferably from 10 to 20% by weight, of the component (a16), the sum of the weight fractions of the components (a11) to (a16) being 100% in each case.

The inventively employed acrylic copolymers (A1) are prepared in an organic solvent or solvent mixture, which is preferably free from aromatic solvents, and in the presence of at least one polymerization initiator. Polymerization initiators used are the polymerization initiators which are customary for the preparation of acrylic copolymers.

Examples of suitable polymerization initiators are initiators which form free radicals, such as, for example, tert-butyl peroxyethylhexanoate, benzoyl peroxide, di-tert-amyl peroxide, azobisisobutyronitrile, and tert-butyl perbenzoate. The initiators are used preferably in an amount of from 1to 25% by weight, with particular preference from 2 to 10% by weight, based on the overall weight of the monomers.

The polymerization is judiciously conducted at a temperature of from 80 to 200° C., preferably from 110 to 180° C.

Preferred solvents used are ethyl glycol, ethoxyethyl propionate and isopropoxypropanol.

The acrylic copolymer (A1) may be prepared by a two-stage process if monomers additional to the mandatory monomers (a11) and (a13) are used. This is done by 1. polymerizing a mixture of the monomers (a11) and (a12) and, if desired, (a14, (a15) and/or (a16), or a mixture of portions of the monomers (a11) and (a12) and also, if desired, (a14), (a15) and/or (a16), in an organic solvent, and 2. after at least 60% by weight of the mixture of (a11) and (a12) and, if desired, (a14), (a15) and/or (a16) have been added, adding the monomer (a13) and any remainder of the monomers (a11) and (a12) and, if appropriate, (a14), (a15) and/or (a16), and continuing polymerization.

In addition, however, it is also possible to include the monomers (a14) and/or (a15) in the initial charge, together with at least some of the solvent, and to meter in the remaining monomers. Furthermore, it is also possible for only some of the monomers (a14) and/or (a15) to be included in the initial charge, together with at least some of the solvent, and for the remainder of these monomers to be added as described above. Preferably, for example, at least 20% by weight of the solvent and about 10% by weight of the monomers (a14) and (a15), and, if desired, portions of the monomers (a11) and (a16), are included in the initial charge.

Preference is further given to a two-stage process in which the first stage lasts for from 1to 8 hours, preferably from 1.5 to 4 hours, and the mixture of (a13) and any remainder of the monomers (a11), (a12) and, if appropriate, (a14), (a15) and (a16) is added over the course of from 20 to 120 minutes, preferably over the course of from 30 to 90 minutes. Following the end of the addition of the mixture of (a13) and any remainder of the monomers (a11) and (a12) and, if appropriate, (a14), (a15) and (a16) polymerization is continued until all of the monomers used have undergone essentially complete reaction. In this case, the second stage may follow on immediately from the first. Alternatively, the second stage may be commenced only after a certain time, for example, after from 10 minutes to 10 hours.

The amount, and rate of addition, of the initiator is preferably chosen so as to give an acrylic copolymer (A1) having a number-average molecular weight Mn of from 1000 to 30000 daltons. It is preferred to commence the addition of initiator some time, generally from about 1to 15 minutes, before the addition of the monomers. Furthermore, preference is given to a process in which the addition of initiator is commenced at the same point in time as the addition of the monomers and ended about half an hour after the addition of the monomers. The initiator is preferably added in a constant amount per unit time. Following the end of the addition of initiator, the reaction mixture is held at polymerization temperature until (generally 1.5 hours) all of the monomers used have undergone essentially complete reaction. "Essentially complete reaction" is intended to denote that preferably 100% by weight of the monomers used have been reacted but that it is also possible for a small residual monomer content of not more than up to about 0.5% by weight, based on the weight of the reaction mixture, to remain unreacted.

Preferably, the monomers for preparing the acrylic copolymers (A1) are polymerized with not too high a polymerization solids, preferably with a polymerization solids of from 80 to 50% by weight, based on the monomers, and then the solvents are partially removed by distillation, so that the resulting acrylic copolymer solutions (A1) have a solids content of preferably from 100 to 60% by weight.

For use in the inventive coating material, the solids content of the solutions of the acrylic copolymer solutions (A1) is adjusted with at least one preferably aromatic-free solvent preferably to less than 60% by weight, particularly preferably less than 40% by weight, and in particular less than 30% by weight.

Examples of suitable solvents are ethoxyethyl propionate and butyl glycol.

The preparation of the acrylic copolymers (A1) for inventive use has no special features in terms of method but instead takes place with the aid of the methods which are customary and known in the field of polymers for continuous or batchwise copolymerization under atmospheric or superatmospheric pressure in stirred vessels, autoclaves, tube reactors or Taylor reactors.

Examples of suitable copolymerization processes are described in the patents DE-A-197 09 465, DE-C-197 09 476, DE-A-28 48 906, DE-A-195 24 182, EP-A-0 554 783, WO 95/27742 or WO 82/02387.

In accordance with the invention, Taylor reactors are advantageous.

Taylor reactors, which serve to convert substances under the conditions of Taylor vortex flow, are known. They consist essentially of two coaxial concentric cylinders of which the outer is fixed while the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. As well as the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta=\omega_i r_i d\nu^{-1}(d/r_i)^{1/2} \quad (I)$$

where $d=r_o-r_i$.

At low angular viscosity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or a vortex cell.

The basis of this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs.

Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor vortex flow are met over substantially the entire reactor length in the reactor volume, i.e. in such a way that the annular gap broadens in the direction of flow traversal.

The proportion of the acrylic copolymer (A1) in the sol-gel clearcoat material may vary very widely and is guided in particular by the intended flexibility of the inventive sol-gel coating produced therefrom. There is an upper limit on the proportion; thus, it may not be chosen so high that phase separation occurs in the coating material of the invention, or the hardness and scratch resistance of the sol-gel coating decrease too sharply. The skilled worker is therefore able to determine the proportion which is optimal in each case, on the basis of his or her knowledge in the art, with or without the assistance of simple preliminary tests.

If desired, it is also possible to add an organic solvent such as aliphatic alcohol, such as methanol, ethanol, propanol, isopropanol or butanol, an ether such a dimethoxyethane, an ester such as dimethyl glycol acetate or methoxypropyl acetate, and/or 2-ethoxyethanol, or a ketone such as acetone or methyl ethyl ketone, to the hydrolyzable silane compounds (B).

If desired, organically modified metal alkoxides are also present. These are hydrolyzable metal alkoxides, it being possible to refer to the corresponding and abovementioned groups R for the silanes in respect of the definition of the hydrolyzable groups. Preferred metal alkoxides used are aluminum, titanium or zirconium alkoxides.

The sol-gel clearcoat material may comprise metal oxide nanoparticles. These nanoparticles are <50 nm. They may comprise, for example, $Al_2O_3$, $ZrO_2$ and/or $TiO_2$.

For the preparation of the sol-gel clearcoat material, the starting components (B) are, for example, precondensed in the desired proportion with a smaller amount of water than the amount required stoichiometrically for complete hydrolysis of all of the hydrolyzable groups used. The substoichiometric amount of water is metered in such away to avoid local excess concentrations. This is done, for example, by introducing the amount of water into the reaction mixture using moisture-laden adsorbents, e.g., silica gel or molecular sieves, hydrous organic solvents, e.g., 80% ethanol, or salt hydrates, e.g., $CaCl_2 \times 6H_2O$. Precondensation takes place preferably in the presence of a condensation catalyst but in the absence of an organic solvent.

Suitable condensation catalysts include proton- or hydroxyl-ion-donating compounds and amines. Specific examples are organic or inorganic acids, such as hydrochloric acid, sulfuric acid, phosphoric acid, formic acid or acetic acid, and organic or inorganic bases such as ammonia, alkali metal hydroxides or alkaline earth metal hydroxides, e.g., sodium, potassium or calcium hydroxide, and amines soluble in the reaction medium, examples being lower alkyl amines or alkanol amines. Particular preference is given in this context to volatile acids and bases, especially hydrochloric acid, ammonia and triethylamine, and also to acetic acid.

The precondensation is continued, for example, until the resulting precondensate still has a liquid consistency. Preferably, it has a solids content of less than 80% by weight, with particular preference less than 60% by weight, and in particular less than 40% by weight. Since the precondensate coating material obtained is sensitive to hydrolysis, it should be stored, if necessary, under conditions which exclude moisture.

The subsequent hydrolytic further condensation of the precondensate can take place in the presence of at least the amount of water stoichiometrically required to hydrolyze the remaining hydrolyzable groups, but preferably with a superstoichiometric amount of water. Further condensation takes place preferably in the presence of one of the abovementioned condensation catalysts.

The precondensate coating material, or the coating material obtained by further condensation, which is also referred to as the stock coating material, may be used per se as sol-gel clearcoat material.

For this end use, however, it is preferably admixed with the acrylic copolymer solution (A1), provided the hydrolysis and precondensation have not been conducted in the presence of the acrylic copolymer (A1).

Furthermore, for purposes of the preparation of the sol-gel clearcoat material, it is preferred to add an additive solution, also referred to as primer, to the stock coating material.

This solution comprises at least one ethylenically unsaturated compound containing at least one epoxide group. An example of a suitable ethylenically unsaturated compound is glycidyl (meth)acrylate.

It further comprises at least one silane (B) containing at least one nonhydrolyzable group R which contains at least one epoxide group. An example of a suitable compound is 3-glycidyloxypropyltrimethoxysilane.

Not least, it comprises at least one adduct of at least one silane (B) containing at least one nonhydrolyzable group R, containing at least one amino group, and at least one cyclic ethylenically unsaturated dicarboxylic anhydride. An example of a suitable silane (B) is 3-aminopropyltriethoxysilane. Examples of suitable dicarboxylic anhydrides are maleic anhydride and itaconic anhydride.

The additive solution contains the ethylenically unsaturated compound, the silane (B) and the adduct in a weight ratio of (1to 10):(1 to 30):1, in particular (2 to 6):(10 to 20):1. The solids content of the additive solution is preferably below 80% by weight, more preferably below 60% by weight, and in particular below 50% by weight.

The proportion of the additive solution in the sol-gel clearcoat material may also vary widely. The skilled worker is able to determine the proportion that is optimal in each case, on the basis of his or her knowledge in the art, with or without the assistance of simple preliminary tests.

Particularly advantageous sol-gel clearcoat materials contain, based in each case on their overall amount, from 5 to 20, preferably from 10 to 15, and in particular from 10.5 to 14% by weight of the acrylic copolymer solution (A1), from 40 to 85, preferably from 45 to 80, and in particular from 50 to 75% by weight of the stock coating material, and from 0.5 to 3, preferably from 1to 2, and in particular from 1.2 to 1.7% by weight of the additive solution.

It is of very particular advantage in this context, in accordance with the invention, for the solids contents of the acrylic copolymer solution (A1), of the stock coating material and of the additive solution to be chosen such that in the sol-gel clearcoat material they are in a weight proportion of solids (A1): solids stock coating material: solids additive solution of 1to 10:30 to 60:1 preferably 2 to 8: 35 to 55:1, and especially 2.5 to 6:40 to 50:1.

The sol-gel clearcoat material may further comprise at least one curing agent. Examples of suitable curing agents are quaternary ammonium compounds such as tetraalkylammonium salts, especially tetramethyl-ammonium iodide. In the sol-gel clearcoat material, the curing agent may preferably be present in an amount of from 0.001 to 1% by weight.

Furthermore, customary coatings additives may also be added to the sol-gel clearcoat material, examples being organic diluents, leveling agents, UV stabilizers, viscosity regulators, or antioxidants. It is possible to use the same additives which are also used for customary coating materials; by way of example, reference may be made to the compounds mentioned in the powder slurry clearcoat material.

Chemical bonding is possible between the powder slurry clearcoat material used and the sol-gel clearcoat material; in other words, both the powder slurry clearcoat material and the sol-gel system contain in each case functional groups which are able to react with one another (principle of "corresponding functional groups"). In the powder slurry clearcoat material, the corresponding functional group may be present, for example, in the crosslinking agent or, preferably, in the binder.

Examples of such suitable functional groups are hydroxyl, siloxane, anhydride, isocyanate, amine, epoxy, and carboxyl groups. The key factor is that a functional group is present firstly in the powder slurry clearcoat material and secondly in the sol-gel clearcoat material, a chemical bond being possible between these two. Examples of functional group pairs permitting such a chemical reaction are epoxide/carboxyl groups, epoxide/hydroxyl groups, functional groups containing reactive H atoms/isocyanate group, such as amines/isocyanate groups and hydroxyl/isocyanate groups. Preference for use as a corresponding functional group is given to the pairing of epoxide group/carboxyl group.

In accordance with the invention it is of advantage here if a certain fraction of the carboxyl-containing crosslinking agent b) or binder b) of the powder clearcoat reacts with a certain fraction of the epoxide groups in the sol-gel clearcoat material.

The introduction of the corresponding functional group in the sol-gel clearcoat material may take place in the organic phase or in the inorganic phase. The corresponding functional group is to be chosen such that it is also present in the finished sol-gel clearcoat material.

For instance, the corresponding functional group may be introduced, for example, by the nonhydrolyzable radical R of the silane (B). An example of a suitable silane (B) is 3-glycidyloxypropyltrimethoxysilane. The functional group may, for example, also be introduced by way of the organic phase, by adding corresponding monomers. For instance, an epoxide group in the case of monomers containing ethylenically unsaturated double bonds for the organic phase of the sol-gel clearcoat material may be introduced, for example, by way of 2,3-epoxypropyl methacrylate.

The reaction of just a small portion of the corresponding functional groups with one another produces a network which, although in the form of a coarse mesh, is entirely adequate for the purpose of the invention.

Following the application of the powder slurry clearcoat material, it is predried and induced to form a film. This takes place at a temperature which, on the one hand, is above the film formation temperature of the powder slurry clearcoat material and, on the other hand, is below the temperature at which the crosslinking of this powder slurry clearcoat material is complete. If $T_F$ is the temperature at which the powder slurry clearcoat material begins to form a film, and $T_V$ the temperature at which the powder slurry clearcoat material has undergone complete crosslinking, then the temperature T at which, in accordance with step A, the predrying and also the film formation take place is governed by:

$$T_F < T < T_V$$

The temperature T may be, for example, between 60° C. and 150° C., preferably between 120° C. and 140° C., and in particular may be situated at 130° C., a period of from 5 to 30 min, preferably from 5 to 15 min, and in particular 10 min, being an advantage in accordance with the invention for the predrying and film formation. Before this predrying and film formation at the temperature T, if desired, the applied powder slurry clearcoat material is initially aerated at from 30 to 60° C., preferably from 40 to 50° C., and in particular 50° C., for from 5 to 30 min, preferably from 5 to 15 min, and in particular 10 min.

In accordance with the invention it is important that the temperature T is not so high that the crosslinking of the powder slurry clearcoat material has come to an end; in other words, in step A) the powder slurry clearcoat material is cured only partly but not completely.

Subsequently, the sol-gel clearcoat material is applied to this powder slurry clearcoat material which has been predried and induced to form a film. Application may take place by any technique known to the skilled worker. Preferably, sol-gel clearcoat material is applied by spraying. In this case the sol-gel clearcoat material is applied preferably as a very thin coating, e.g., <10 μm.

Subsequently, the powder slurry clearcoat film and the sol-gel clearcoat film are cured conjointly. This may be carried out, for example, at temperatures of above 85° C., preferably above 1300C and below 170° C., more preferably below 160° C. The duration of baking may vary widely and may be adapted outstandingly to the particular coating system present. In general, the duration of baking is between 10 min and 5 hours, preferably between 15 min and one hour.

If dodecane-1,12-dicarboxylic acid is used as crosslinking agent for the powder slurry clearcoat material, then it is advantageous if the temperature used in step A) corresponds approximately to the melting point of dodecane-1,12-dicarboxylic acid. In that case the temperature used in step A) differs preferably by not more than 5° C. from the melting point of dodecane-1,12-dicarboxylic acid.

The coated substrates produced by the process of the invention are notable for very good scratch resistance coupled with very good adhesion, even after exposure to condensation, between powder slurry clearcoat material and sol-gel clearcoat. The appearance too is good. The process of the invention is therefore particularly suitable for the coating of vehicle bodies, especially automobile bodies, with multicoat systems; for industrial coating, including the coil coating process; and for furniture coating.

EXAMPLE AND COMPARATIVE EXPERIMENT C1

1. The Preparation of the Starting Compounds
1.1 The preparation of a glycidyl-containing acrylic resin as binder a)
21.1 parts of xylene were charged to an appropriate reaction vessel and heated to 130° C. The initiator, consisting of 4.5 parts of TBPEH (tert-butyl perethylhexanoate) and 4.86 parts of xylene, and the monomer mixture, consisting of 10.78 parts of methyl methacrylate, 25.5 parts of n-butyl methacrylate, 17.39 parts of styrene and 23.95 parts of glycidyl methacrylate, were metered into this initial charge at 130° C. over the course of four hours from two separate feed vessels. Subsequently, the resulting mixture was heated to 180° C., and the solvent was stripped off in vacuo at less than 100 mbar. This gave the acrylic resin 1.1.
1.2 The preparation of a hydroxyl-containing acrylic resin as polyol c)
23.83 parts of xylene were charged to an appropriate reaction vessel and heated to 130° C. The initiator, consisting of 4.03 parts of TBPEH (tert-butyl perethylhexanoate) and 4.03 parts of xylene, and the monomer mixture, consisting of 17.45 parts of methyl methacrylate, 14.09 parts of n-butyl methacrylate, 16.78 parts of styrene and 18.79 parts of hydroxypropyl methacrylate, were metered into this initial charge at 130° C. over the course of four hours from two separate feed vessels. Subsequently, the two feed vessels were rinsed out with 0.5 part of xylene. Subsequently, the resulting mixture was heated to 180° C., and the solvent was stripped off in vacuo at less than 100 mbar. This gave the acrylic resin 1.2.

2. The Preparation of a Powder Clearcoat Material 62.8 parts of the acrylic resin 0.1, 13.5 parts of dodecanedicarboxylic acid, 5.0 parts of solvent-free tris(alkoxycarbonylamino)triazine, 14.8 parts of acrylic resin 1.2, 2.0 parts of Tinuvin 1130 (UV absorber from Ciba-Geigy), 0.9 part of Tinuvin 144 (light stabilizer based on a hindered amine (HALS), from Ciba-Geigy), 0.4 part of Additol XL (leveling agent from Hoechst AG) and 0.4 part of benzoin (devolatilizer) were intimately mixed in a Henschel fluid mixer, extruded on a BUSS PLK 46 extruder, and ground in a Hosokawa ACM 2 mill. The powder clearcoat material was sieved off through a 125 micrometer sieve.

The solvent-free tris(alkoxycarbonylamino)triazine, for its part, was obtained by removing the solvent from the commercial resin solution (51% strength in n-butanol, from Cytec) by distillation under reduced pressure at from 50 to 130° C. and discharging the resulting resin melt onto a pelletizing cooling belt or into a cooling pan.

This gave the powder clearcoat material 2.

3. The Preparation of a Powder Slurry Clearcoat Material 0.6 part of Troykyd D777 (defoamer from Troy Chemical Company), 0.6 part of Orotan 731K (dispersing aid from Rohm & Haas), 0.06 part of Surfynol TMN 6 (wetting agent from Air Products) and 16.5 parts of RM8 (nonionic associative thickener based on polyurethanes, from Rohm & Haas) were dispersed in 400 parts of deionized water. Subsequently, 94 parts of the powder clearcoat material 2. were introduced with stirring in small portions. Subsequently, a further 0.6 part of Troykyd D777, 0.6 part of Orotan 731K, 0.06 part of Surfynol TMN 6 and 16.5 parts of RM8 were incorporated by dispersion. Subsequently, a further 94 parts of the powder clearcoat material 2. were introduced with stirring, in small portions.

The resultant mixture was ground in a sand mill for 3.5 hours. The subsequently measured average particle size was 4 μm. The powder clearcoat slurry was filtered through a 50 μm filter and admixed with 0.05% by weight, based on its overall amount, of Byk 345 (leveling agent from Byk).

This gave the powder clearcoat slurry 3.

4. The Preparation of the Sol-gel Clearcoat Material for Inventive Use
4.1 The preparation of a stock coating material
An appropriate reaction vessel was charged with 30 parts of deionized water, 40 parts of ethyl glycol, 5 parts of 100% acetic acid, 66.5 parts of methyltriethoxysilane, and 3.5 parts of 3-glycidyloxypropyltrimethoxysilane, and this initial charge was heated with stirring to 60° C. After a further 3 hours at 60° C., the reaction mixture was heated to 90° C. with stirring, and was held at this temperature for 2 hours. Subsequently, 70 parts of the reaction mixture were removed by azeotropic distillation. After cooling to room temperature, 5 parts of methoxypropyl acetate and 0.1 part of BYK 301 (leveling agent from BYK) were added to the reaction mixture. This gave the stock coating material 4.1.
4.2 The preparation of a polyacrylate for modifying the sol-gel clearcoat material
5 parts of acrylic acid, 95 parts of methyl methacrylate and 4 parts of the initiator TBPEH (tert-butyl perethylhexanoate) were polymerized in 420 parts of ethyl glycol at 110° C. for two hours. This gave the organically modifying solution 4.2.
4.3 The preparation of a primer (additive solution)
15 parts of ethyl glycol, 2 parts of 2,3-epoxypropyl methacrylate, 7.5 parts of 3-glycidyloxypropyltrimethoxysilane, 0.5 part of an adduct of maleic anhydride and 3-aminopropyltriethoxysilane, and 0.1 part of azodicarboxamide (GenitronR AZDN-M) were mixed with one another, with stirring, at 100° C. for six hours. This gave the primer 4.3.

The adduct, for its part, was prepared by reacting with one another 220 parts of 3-aminopropyltriethoxysilane and 100 parts of maleic anhydride.

4.4 The preparation of the sol-gel clearcoat material

The sol-gel clearcoat material 4. was obtained by mixing with one another 14.3 parts of a stock coating material 4.1 (36% strength in ethyl glycol), 2.14 parts of the solution 4.2, 2.7 parts of methoxypropyl acetate, 0.014 part of BYK 301, 0.3 part of the primer 4.3, and 0.15 part of Tinuvin 329 (30% strength in toluene, light stabilizer from Ciba-Geigy).

5. The Application of the Inventive Powder Clearcoat Slurry 3 (example and comparative example C1)

The powder clearcoat slurry 3. was applied using a so-called integrated system, which is described below for the metallic shade jungle green.

Using a gravity feed gun, a functional film of the coating material Ecoprime® from BASF Coatings AG was applied first of all to steel panels coated cathodically with a commercially customary electrodeposition coating material. After flashing off at room temperature for five minutes, a green metallic aqueous basecoat material (Ecostar® jungle green from BASF Coatings AG) was applied in the same way to this film and was subsequently predried at 80° C. for 10 minutes.

After the panels had been cooled, the powder clearcoat slurry 3. was applied in the same way, followed by predrying at 50° C. for 10 minutes and partial crosslinking at 130° C. for 10 minutes (example).

This process step was repeated with further panels, except that the multicoat system was baked at 150° C. for 30 minutes, resulting in complete crosslinking (comparative experiment C1).

Subsequently, the sol-gel clearcoat material 4. was applied to the panels of the example and of the comparative example Cl, and then predried at 50° C. for 10 minutes. Thereafter, the coating films were baked at 150° C. for 30 minutes.

This resulted in two overall metallic coating systems in the jungle green shade on the inventive and the noninventive test panels 5.

The thickness of the wet films was chosen so that, after baking, the dry coat thicknesses of the functional coat and of the metallic aqueous basecoat were in each case 15 micrometers; the coat thickness of the clearcoat was 44 μm, and that of the sol-gel clearcoat was 8 μm.

6. The Testing of the Mechanotechnological Properties of the Inventive Test Panels 5. (example) and of the Noninventive Test panels 5. (comparative experiment C1)

6.1 Scratch resistance and adhesion of the sol-gel clearcoat material

The table gives an overview of the mechanotechnological tests and of the results obtained in them.

TABLE

Mechanotechnological properties of the inventive and of the noninventive test panels 5.
Test methods

| Scratch test to DBL 7399 [Rating 0 to 5] | Example 0 | Comparative Experiment C1 0 |
|---|---|---|
| Scratch test after 240 hours of constant condensation conditions (CCC) [Rating 0 to 5] | 0 | 0 |
| Cross-hatch to DIN 53151 [2 mm] [Rating 0 to 5] | 0 | 5 |
| Cross-hatch after 240 hours of CCC and 24 hours of regeneration | 0 | 5 |

[Rating from 0 to 5]:
0 = best;
5 = worst

On clearcoat materials which had been baked completely prior to their overcoating with sol-gel coating (comparative experiment C1), therefore, there was complete delamination of the sol-gel clearcoat.

6.2 Scratch resistance by the brush test

The scratch resistance of the sol-gel clearcoat material on the inventive test panels 5. was assessed with the aid of the BASF brush test described in FIG. 2 on page 28 of the article by P. Betz and A. Bartelt, Progress in Organic Coatings, 22 (1993), pages 27–37, albeit with modification with regard to the weight used (2000 g instead of the 280 g specified therein), assessment taking place as follows:

In the test, the film surface was damaged using a mesh fabric loaded with a mass. The mesh fabric and the film surface were wetted copiously with a laundry detergent solution. The test panel was moved back and forward under the mesh fabric in reciprocal movements by means of a motor drive.

The test panels were prepared by applying first an electrocoat with a film thickness of 18–22 μm, then a primer-surfacer with a film thickness of 35–40 μm, then a black basecoat with a film thickness of 20–25 μm, and finally, by the procedure of the invention, the powder slurry clearcoat material with a film thickness of 40–45 μm and the sol-gel clearcoat material with a film thickness of 8 Am, each of which were cured. The panels, following application of the coating materials, were stored at room temperature for at least 2 weeks before testing was carried out.

The test element was an eraser (4.5×2.0 cm, broad side perpendicular to the direction of scratching) covered with nylon mesh fabric (No. 11, 31 μm mesh size, Tg 50° C.). The applied weight was 2000 g.

Prior to each test, the mesh fabric was replaced, with the running direction of the fabric meshes parallel to the direction of scratching. Using a pipette, approximately 1ml of a freshly stirred 0.25% strength Persil solution was applied in front of the eraser. The rotary speed of the motor was adjusted so that 80 double strokes were performed within a period of 80 s. After the test, the remaining washing liquid was rinsed off with cold tap water and the test panel was blown dry using compressed air. The gloss to DIN 67530 was measured before and after damage (measurement direction perpendicular to the direction of scratching).

It was found in this test that the gloss does not change at all as a result of the loading, which is a convincing demonstration of the extremely high scratch resistance of the clearcoat of the invention.

What is claimed is:

1. A process for producing a coated substrate, comprising applying a powder slurry clearcoat material to a substrate to form a coated substrate, subjecting the coated substrate to a temperature such that the powder slurry clearcoat material is predried and induced to form a film which is only partly cured, said temperature being above the film formation temperature of the powder slurry clearcoat material and below the temperature at which crosslinking of the powder slurry clearcoat material is complete, applying a sol-gel clearcoat material to the only partly cured powder slurry material film, and curing the sol-gel clearcoat material and the only partly cured powder slurry material film conjointly such that a chemical bond results between them.

2. The process of claim 1, wherein the powder slurry clearcoat material comprises epoxide groups and carboxyl groups, and the sol-gel clearcoat material comprises epoxide groups.

3. The process of claim 2, wherein the powder slurry clearcoat material comprises at least one binder containing epoxide groups, at least one carboxyl-containing crosslinking agent, and an aqueous dispersion comprising at least one nonionic thickener and a dispersant in the form of a nonionic polyurethane dispersion.

4. The process of claim 3, wherein the crosslinking agent is dodecane-1,12-dicarboxylic acid.

5. The process of claim 4, wherein the temperature to which the coated substrate is subjected to corresponds approximately to the melting point of dodecane-1,12-dicarboxylic acid.

6. The process of claim 1, wherein the sol-gel clearcoat is applied in a film thickness of not more than 10 $\mu$m.

7. A coated substrate prepared by the process of claim 1.

8. The coated substrate of claim 7, which is a vehicle body.

9. A process for making a vehicle, comprising using the coated substrate of claim 7.

10. The process of claim 1 wherein one or more coating compositions have been applied to the substrate prior to the application of the powder slurry clearcoat material.

11. The process of claim 3, wherein the at least one binder comprises a polyacrylate resin containing epoxide groups.

12. The process of claim 3 wherein the at least one carboxyl-containing crosslinking agent is selected from the group consisting of straight-chain, aliphatic dicarboxylic acids, carboxy-functional polyesters, and mixtures thereof.

* * * * *